R. MARCY.
AUTOMATIC TRAIN STOP MECHANISM.
APPLICATION FILED MAR. 6, 1919.

1,402,367.

Patented Jan. 3, 1922.
8 SHEETS—SHEET 4.

Inventor
Richard Marcy
By
Attorney

R. MARCY.
AUTOMATIC TRAIN STOP MECHANISM.
APPLICATION FILED MAR. 6, 1919.

1,402,367.

Patented Jan. 3, 1922.
8 SHEETS—SHEET 7.

Inventor
Richard Marcy
By Ellis Spear
Attorney

UNITED STATES PATENT OFFICE.

RICHARD MARCY, OF LINCOLN, MASSACHUSETTS.

AUTOMATIC TRAIN-STOP MECHANISM.

1,402,367.

Specification of Letters Patent.   Patented Jan. 3, 1922.

Application filed March 6, 1919.   Serial No. 281,023.

*To all whom it may concern:*

Be it known that I, RICHARD MARCY, a citizen of the United States, residing at Lincoln, county of Middlesex, Commonwealth of Massachusetts, have invented certain new and useful Improvements in Automatic Train-Stop Mechanism, of which the following is a specification.

This invention relates to automatic train stop equipment, and particularly to the train - carried equipment as distinguished from the track installation.

The train-carried installation as herein set forth includes a train-line relief which is adapted to be actuated by the track obstacle and which upon actuation vents the train-line system, causing the application of the brakes, a predominent speed-governed mechanism, and a semi-dominant engineer's permissive device dominating the train-line relief but dominated by the speed-governed mechanism and allowing the engineer to deliberately reclose the train-line system and resume control after he has complied with certain conditions.

Broadly the objects of this invention are to provide an installation which will automatically bring the train to a stop at any speed; which will permit the engineer to reclose the train-line system below a certain predetermined minimum speed deemed safe to proceed without first bringing the train to an absolute stop; which will prevent the engineer from reclosing the system and proceeding until the train speed has been reduced to said predetermined minimum safe speed; and which will permit the engineer to deliberately let himself by a track obstacle set against him without bringing the train to a stop, provided that he first voluntarily reduces his speed to a minimum safe speed and afterwards recloses the system, all so constructed and arranged that breakage or failure of any essential part of the mechanism automatically causes the application of the brakes. More specifically, the object of this invention is to improve and simplify the various mechanisms for effecting these several results, whereby to assure reliable and positive operation.

One important feature of this invention is the provision for automatically shutting off from the train-line the main air reservoir supply as soon as the trip arm is actuated, so that when the train-line has been vented no more air from the main reservoir is allowed to enter the train line pipe, but instead the air is diverted through the speed governed valve to the engineer's permissive valve and thence upon operation of said permissive valve to the system reclosing mechanism.

In its preferred embodiment, this automatic shut-off is so arranged as to work simultaneously with the vent valve in the train line pipe, whereby a single actuation of the train-carried trip arm simultaneously operates both valves.

Other features of my invention will appear more fully hereinafter. The construction and operation of this equipment is fully disclosed in the specification which follows. In the drawings accompanying that specification an embodiment is shown which has been found by test to be wholly satisfactory for the purposes intended. Throughout the specification and drawings like reference numerals are correspondingly applied, and in the drawings—

Fig. 26 is a diagrammatic lay-out of the engine equipment and connections.

Figure 1:
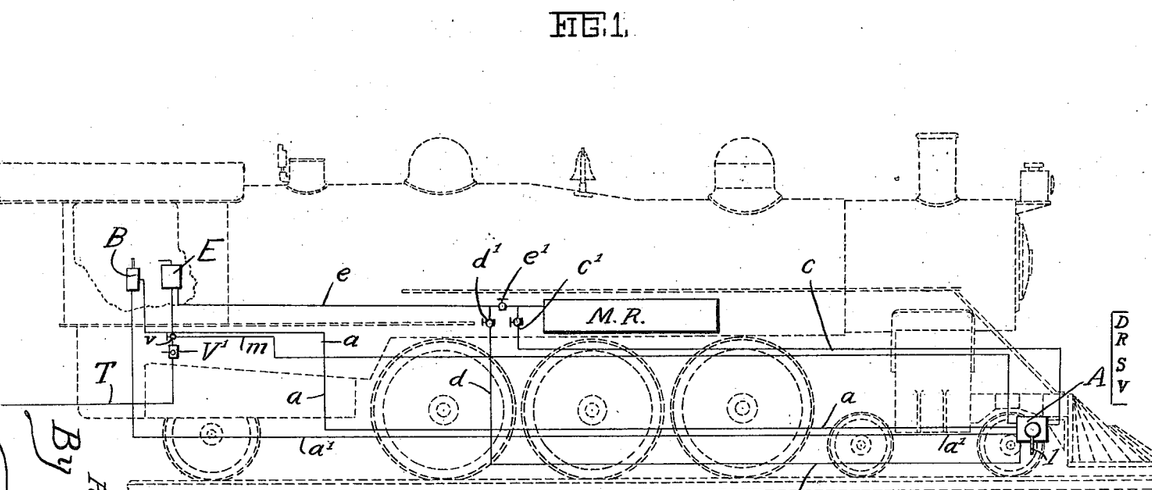
Fig. 1 is a diagrammatic view of an engine equipped with my invention, showing the relative location of the essential parts of my equipment.
Figure 2:
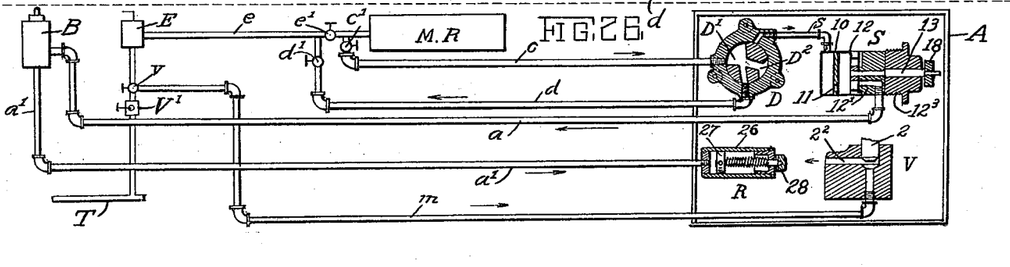
Fig. 2 is a rear view with the cover plate of the engine box partly broken away to illustrate the speed-governed control valve.
Figure 3:
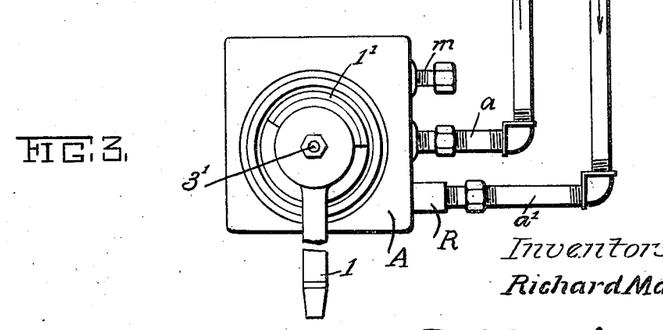
Fig. 3 is an elevation illustrating the relation of the engine box and engineer's permissive control device and the connections therebetween.

I have indicated at A Fig. 1, a housing in which are located the train-line pressure relief mechanism V, the automatic pressure diverting valve D, the dominant speed governed valve S which controls the engineer's power to reset valves and release brakes by use of mechanism B. This housing may be mounted at any desired place upon the engine, and will be hereinafter referred to as the engine box.

The automatic pressure diverting valve D located in the engine box A is cut into the pipe $e$ which connects the main pressure reservoir M R with the engineer's valve E by the pipes $c$ and $d$. The voluntarily operable engineer's permissive valve B is connected by the pipes $a$ and $a^1$ to the valve D and resetting device R respectively. The train line pipe $e$ and the pipes $c$ and $d$ may all be equipped with hand operated shut-offs $e^1$, $c^1$ and $d^1$. The valves $c^1$ and $d^1$ are normally open and the valve $e^1$ is normally closed. The purpose of these valves is to divert the pressure from the reservoir M R through the controls within the box A before reaching the engineer's valve E.

The train line pipe $e$ leads to the usual engineer's lap valve E and from said valve the pressure is carried by the connection T to the various brake cylinders of the engine and the cars.

Under normal conditions, the engineer uses the lap valve E to stop his train. When, however, the trip arm 1 which is mounted upon the engine box A is actuated by a track obstacle set at danger position the pressure is automatically taken away from the engineer's valve and the train-line system is vented automatically by the automatic installation V to bring the train to a stop or to reduce the train speed to a predetermined minimum safe speed and the engineer cannot resume control until said safe speed has been reached and he has deliberately reclosed the automatic system. If, however, the engineer observes and heeds the danger signal displayed by the usual block signal system, and voluntarily reduces the speed of his train to the safe speed before actuation of the trip arm by the track obstacle, which preferably will work in conjunction with the block signal system, he may let himself by the track obstacle without having the control of his engine automatically taken from him.

Figures 12, 13, 14:
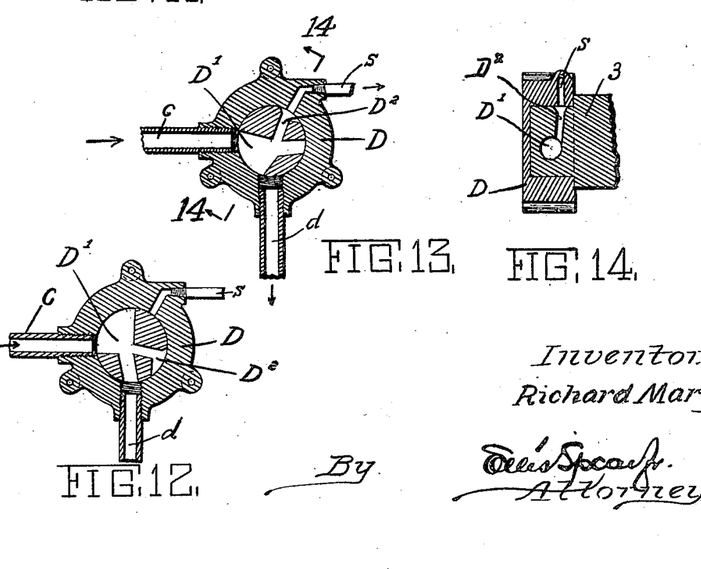
Fig. 12 is a section on the line 12—12 of Fig. 9 and showing the normal position of the automatic pressure diverting valve.
Fig. 13 is a similar view thereof showing the tripped position of said valve.
Fig. 14 is a detail section on the line 14—14 of Fig. 13.

The pipes $c$ and $d$ lead to an automatic pressure diverting valve D mounted on the end of the rock shaft 3 which carries the arm 1. The valve D has a passage $D^1$ normally establishing communication between said pipes $c$ and $d$, as shown in Fig. 12, and adapted upon operation, as shown in Fig. 13, to destroy said communication and divert the pressure from the main reservoir into the pipe $s$ which leads to the speed governed valve S see dotted lines Fig. 6, and from thence to the engineer's permissive valve B and through said valve to the system reclosing mechanism R.

From the pressure diverting valve D the pipe $d$ leads back to the train line pipe $e$ and from thence to the engineer's valve E and to the train line system through the connection T. Thus normally the pressure from the main reservoir M R passes along the pipe $c$ to the automatic valve D thence through the passage $D^1$ of said valve to the pipe $d$ and back to the train line pipe $e$ beyond the valve $e^1$.

Figure 6:
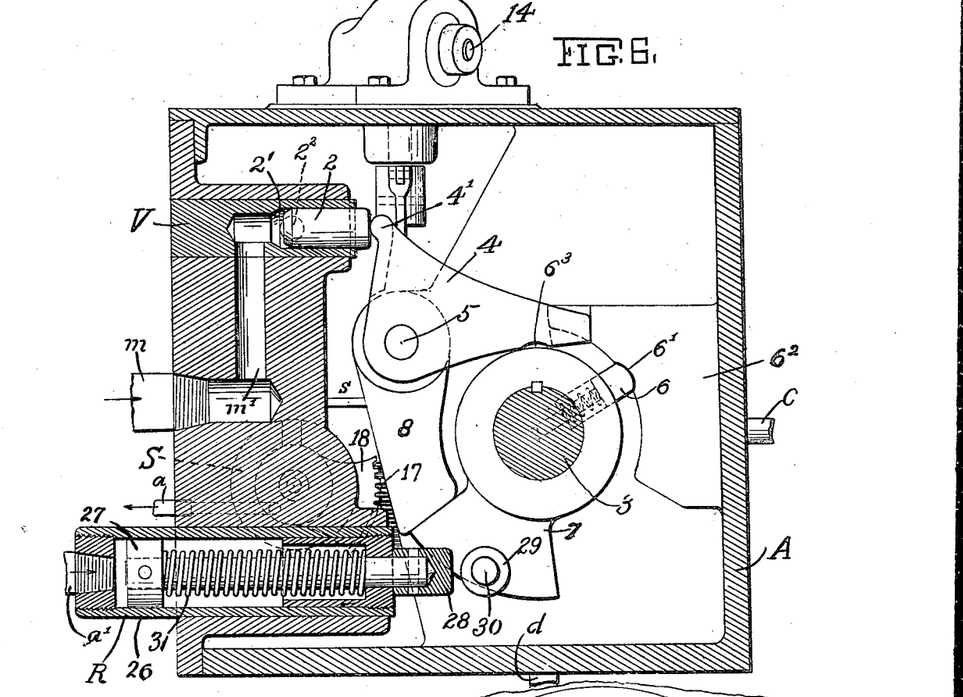
Fig. 6 is a detail section on the line 6—6 of Fig. 9 and particularly illustrating the relief valve controlling the train-line pressure, and the retaining and resetting mechanisms for this valve.
Figure 7:
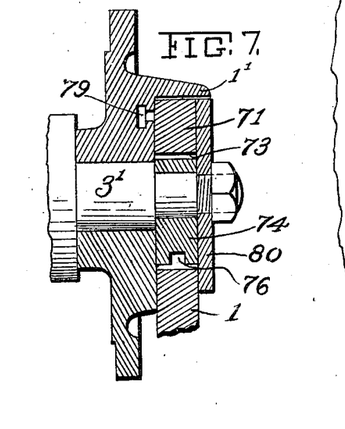
Fig. 7 is a fragmentary detail section on the line 7—7 of Fig. 8 illustrating the connection of the train-carried trip arm to the rock shaft.
Figure 8:
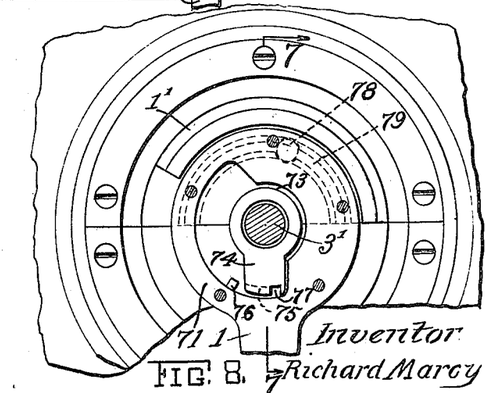
Fig. 8 is an enlarged fragmentary face view of the parts shown in Fig. 7.
Figures 9, 10:
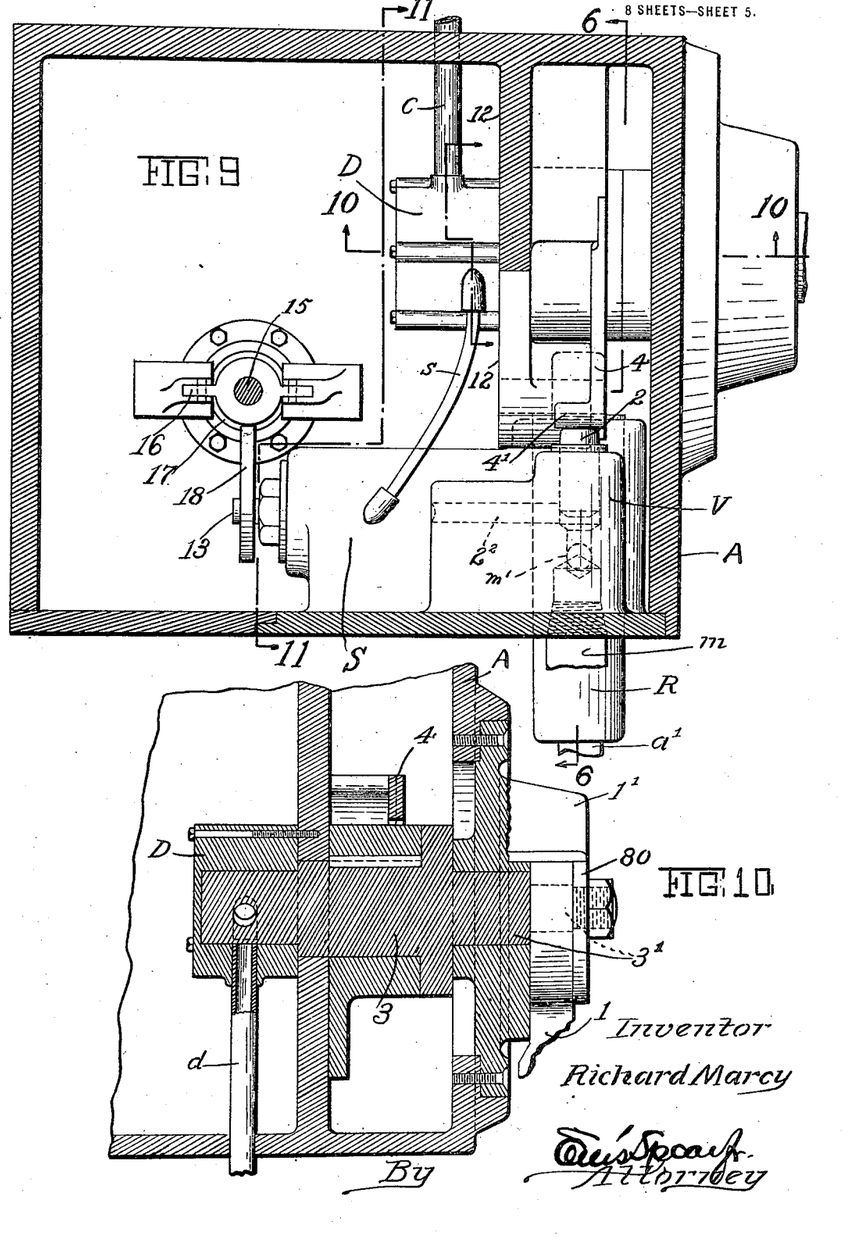
Fig. 9 is a plan section through the engine box.
Fig. 10 is a section on the line 10—10 of Fig. 9.
Figure 11:
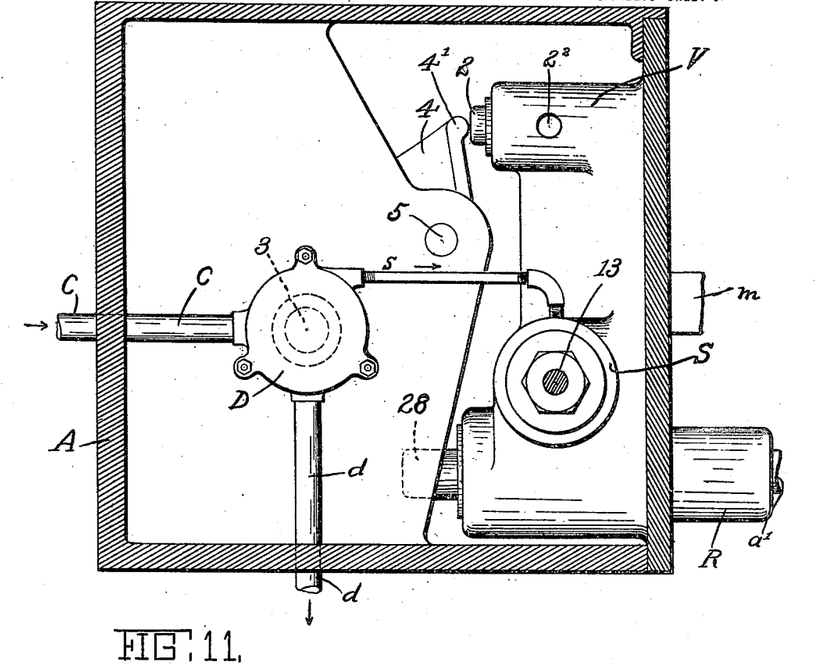
Fig. 11 is a section on the line 11—11 of Fig. 9.

Into the train line at a point $v$ between the engineer's valve E and cut-out valve $V^1$ is tapped a brake pipe $m$ which leads into a passage $m^1$ cored in a casting fixed within the engine box A (see Fig. 6). The escape of pressure from this passage $m^1$ is normally prevented by a vent valve 2 opening with the pressure to uncover a passage $2^2$ into the interior of the engine box A. The valve 2 is normally held to its seat $2^1$ in said passage by a gravity-operating retainer 4 which is pivoted within the box A at 5 and is supported by the detent 6 and released through the movement of the rock shaft 3 from which the trip arm 1 is hung.

When the trip arm 1 is swung in its effective direction, the rotation of the rock shaft 3 is limited by contact of its stub arm 7 with a fixed stop 8 in the engine box. The rock shaft is locked in its position of extreme movement by the spring actuated detent 6 carried on it by engagement in the recess $6^1$ in a lug $6^2$ formed on a wall of the engine box. Normally, the detent 6 engages in a locking notch $6^3$ formed in the pivoted gravity-operating member 4. When the rock shaft is rotated, the detent 6 is withdrawn from said notch $6^3$ and the retainer turns on its pivot, thereby rocking its valve-retaining portion $4^1$ away from the end of the valve 2.

The pressure in the pipe $b$ thereupon moves the valve 2 away from its seat and the train line is vented through the passage $2^2$. The same movement of the rock shaft which releases the retainer 4 simultaneously shuts off communication between the pipes $c$ and $d$ by rotating the automatic valve D which is formed on the end of said rock shaft, sufficiently to move the passage $D^1$ thereof out of registry with the pipe $d$ as shown in Fig. 13, and diverts the pressure from the main reservoir through the pipe $s$ to a speed governed valve S which controls the power of the engineer to release the brakes by use of the resetting mechanism B. To this end the automatic valve D is provided with a by-pass $D^2$ leading from the main passage $D^1$ thereof, and normally covered, when the valve is in the position shown in Fig. 12, by a wall of the casing in which the valve D is mounted. This by-pass $D^2$ registers with the passage $D^3$ in said casing when the automatic valve is actuated, as shown in Fig. 13, so that the air from the reservoir entering the valve through the pipe $c$ is diverted from the pipe $d$ along the passages $D^2$ and $D^3$ into a pipe $s$ leading to the speed governed valve S.

The speed governed valve S is rotatably mounted in a chamber 9 into which the pipe $s$ leads. This chamber is divided by a wall 10, the purpose of which is to relieve the valve of the direct air pressure. The wall 10 has a port 11 therein allowing passage of the air to the valve which as here shown consists of a disc 12 mounted on a shaft 13 which is turned in accordance with train speed from any suitable part rotating at train speed, as from an axle.

Figures 4, 5:
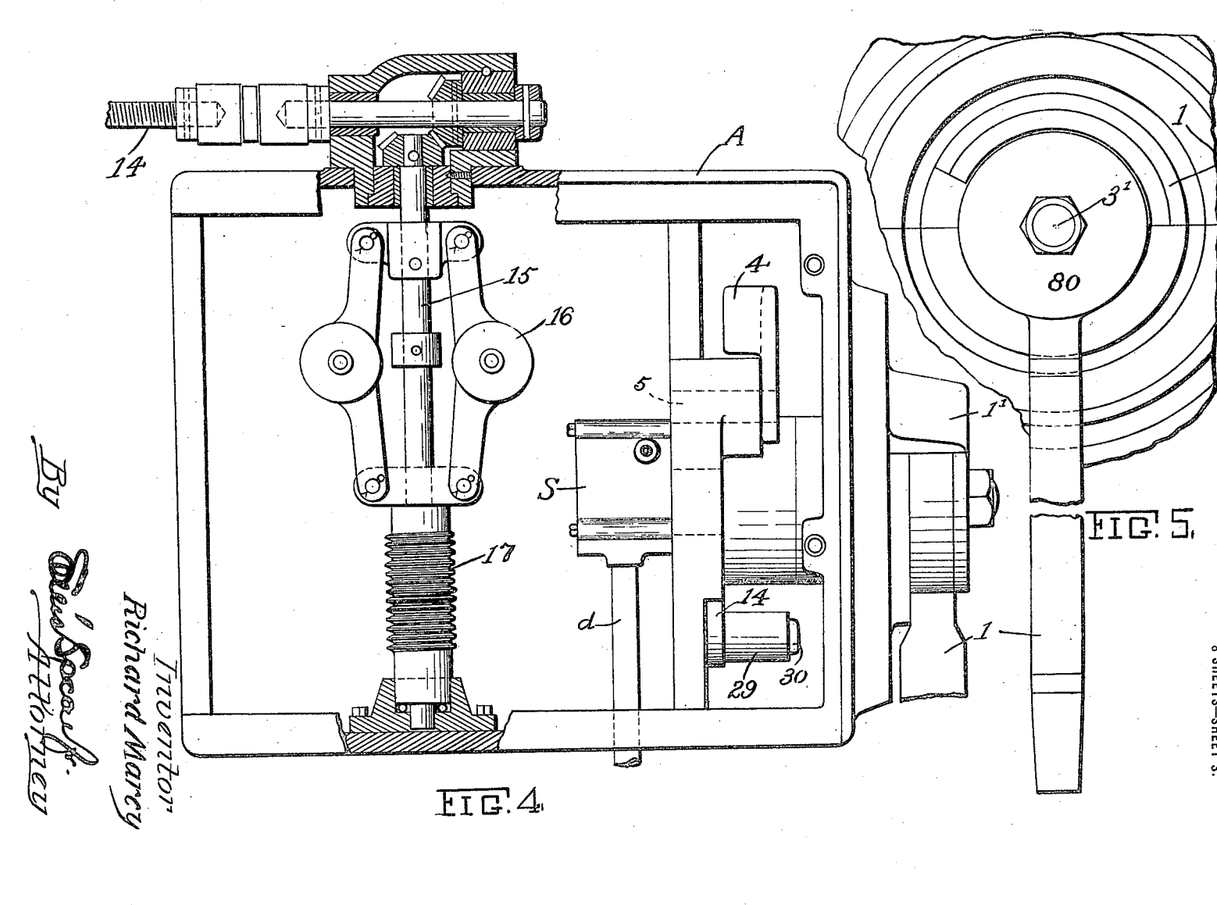
Fig. 4 is a view looking into the engine box from the rear with the back cover and attached parts removed, and particularly illustrating the driving connections for the speed-governed relief control valve.
Fig. 5 is a fragmentary face view of the train-carried tripping arm shown in Fig. 4.

The driving connections for the shaft 13 comprise a flexible shaft 14 driven from the axle or other part rotating at train speed and operatively connected by a suitable gearing with a governor shaft 15 journaled in the engine box A (see Fig. 4). On the shaft 15 is mounted a governor 16 operatively connected with a rack 17 sleeved about the governor shaft 15 and raised and lowered by the governor according to the train speed. The rack 17 meshes with a toothed section 18 carried by the shaft 13 of the valve S.

The air admitted to the disc valve through the port 11 is exhausted through a port $12^1$ in the keyed plug $12^2$ which is held in place by the threaded follower $12^3$. The port $12^1$ is covered and uncovered by the disc valve 12. The air passing through said port $12^1$ delivers to the permissive valve B in the engine cab through the pipe $a$.

When the train speed is below the predetermined minimum safe speed, usually fifteen miles per hour, the governor which is set to become effective at this speed, transmits no rotation to the valve shaft 13, and the port $12^1$ is therefore not covered by the disc 12. When the train speed exceeds the predetermined minimum safe speed, the governor will rotate the disc valve a distance sufficient to cause the disc 12 to cover the port $12^1$, thereby closing said port and preventing passage of the air therefrom to the engineer's permissive valve B. This arrangement compels the engineer to first reduce the speed of the train to the predetermined minimum safe speed before he can reclose the automatic system and assume control of his train.

Figure 15:
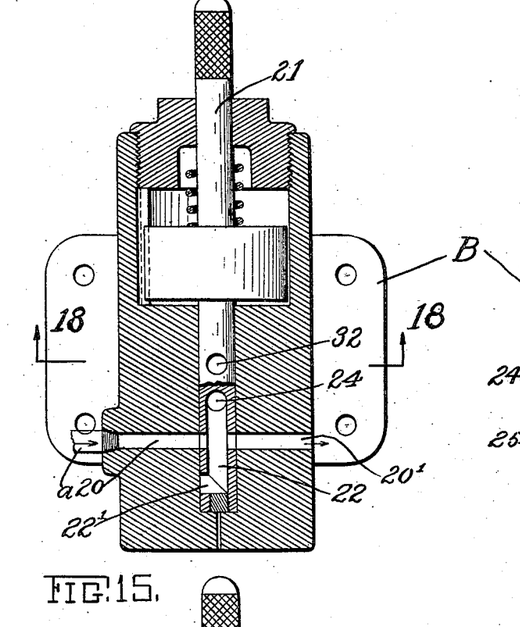
Fig. 15 is a section through the engineer's permissive control device, on the line 15—15 of Fig. 18.

The air escaping through the port $12^1$ when said port is uncovered enters the engineer's permissive valve B through the pipe $a$ at 20. This valve consists of a cylinder located in the cab within convenient reach of the engineer, and a weighted spring-resisted plunger 21 is vertically movable in said cylinder. The lower end of the plunger is provided with a by-pass 22 having lateral ports normally registered with the opposite portions of the passage 20—$20^1$ through which the air from the speed governed valve passes, whereby the air may normally escape through said passage $20^1$ and out to the atmosphere (see Fig. 15).

Figures 17, 18:
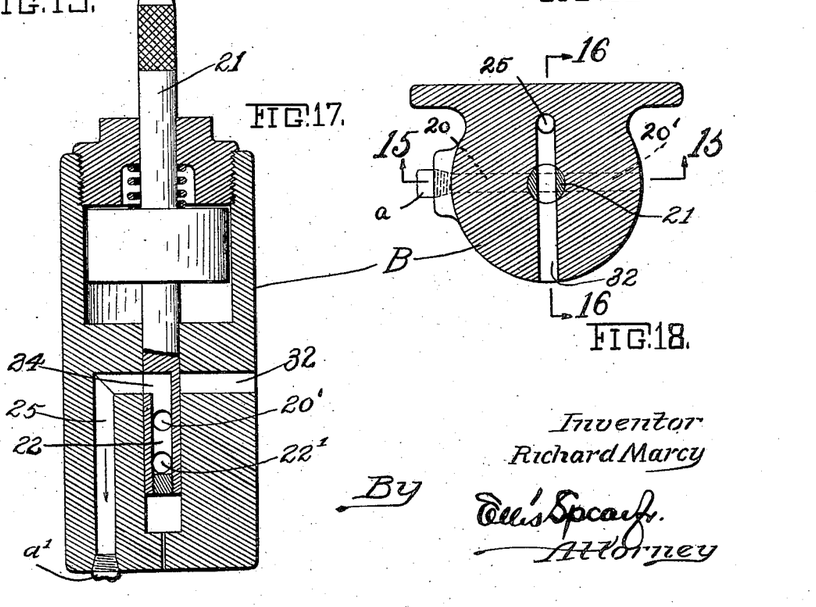
Fig. 18 is a transverse section on the line 18—18 of Fig. 15.
Figure 19:
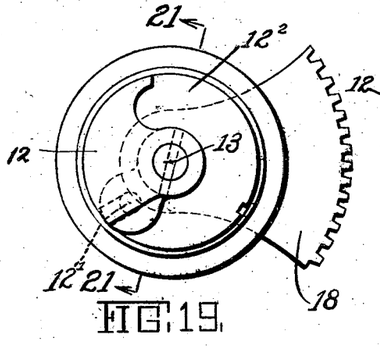
Fig. 19 is an end elevation of the speed-governed relief valve.
Figure 20:
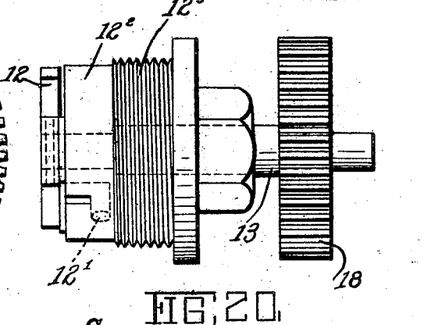
Fig. 20 is a side elevation thereof.
Figure 21:
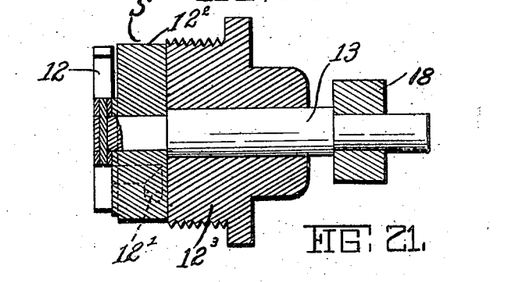
Fig. 21 is a section on the line 21—21 of Fig. 19.
Figure 22:
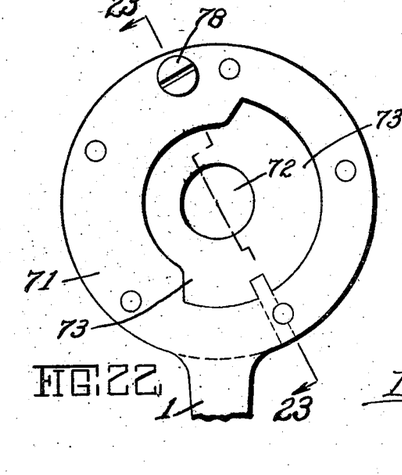
Fig. 22 is a rear view of the head of the train-carried tripping arm.

When the plunger is raised, however, as shown in Fig. 17, the continuous passage across the lower end thereof is broken and the air entering at 20 is diverted into the intake end $22^1$ of the by-pass 22 and out through the exit end 24 of the by-pass, which end 24 by the raising of the plunger, is moved into registry with a passage 25 formed in the cylinder casting and delivering to the pipe $a^1$ leading to the reclosing apparatus R for reclosing the valves 2 and D.

This reclosing apparatus R consists of a cylinder 26 arranged in the engine box A (see Fig. 6) in which works a piston 27 carrying a lug 28 adapted to contact a roll 29 carried by a stud 30 on the stub arm 7 formed on the rock shaft 3. When, therefore, pressure is delivered into the pipe $a^1$ this pressure moves the piston 27 against the roll 29 on the rock shaft, thereby rotating said shaft counter to the direction in which it was rotated by effective actuation of the trip arm and restoring the retainer 4 to position to again seat the valve 2, and rotating the valve portion D of the rock shaft back to the position shown in Fig. 12, in which position the communication between the pipes $c$ and $d$ is again restored and the speed governed valve S is shut off.

Figure 16:
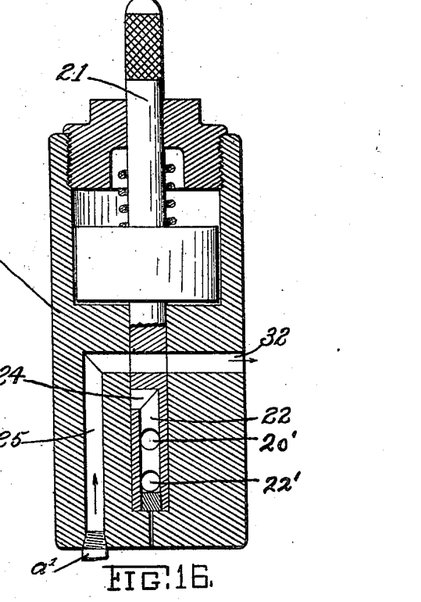
Figs. 16 and 17 are views at right angles to Fig. 15 taken on the line 16—16 of Fig. 18 and illustrating the normal and raised positions of the plunger.

The piston 27 works against the action of a coiled spring 31 which is adapted to return the piston to normal position after each actuation. The cylinder 26 is vented of any pressure behind the piston which might resist the return movement of the piston by the pipe $a^1$ and passage 25, which passage 25 when the plunger has been released and drops to its normal position shown in Figs. 15 and 16 registers with a passage 32 formed in the cylinder casting B and communicating with the external atmosphere, (see Fig. 16). This passage 32 is cut off by a wall of the by-pass when the plunger is raised (see Fig. 17).

According to the present invention the trip arm 1 is adapted to swing idly in one direction when actuated by a track obstacle without transmitting rotation to the rock shaft 3 and to transmit rotation to the rock shaft 3 when swung in the opposite direction.

This arrangement permits a train running against the current of traffic, as in backing, to pass a track obstacle set at danger without automatically stopping itself, and as here shown may be accomplished by forming the arm 1 with an enlarged circular head 71 having an elongated slot 73 in which works a lug 74 fast on the rock shaft. When the trip arm is swung in its effective direction, the wall $73^1$ of the slot 73 contacts the lug 74 and the motion of the arm revolves the rock shaft. When the arm is swung in its ineffective direction no motion is transmitted to the rock shaft and the arm therefore simply swings idly.

The trip arm is preferably so mounted on the rock shaft as to be incapable of removal therefrom without first revolving the shaft and thereby causing a brake application. As here shown this object is secured by providing the lug 74 with a groove 75 in its lower edge in which a pin 76 fast on the head of the trip arm is allowed to move freely. The pin is removable from the groove through an opening 77 let in one wall of the groove. Protruding from the head of the trip arm is a stud 78 adapted to move freely in a locking slot 79 formed in that portion of the casing which constitutes a bearing for the rock shaft. The relative arrangement of the stud 11, groove 75, pin 76, and opening 77 in the groove 75 is such as to prevent the trip arm being removed from the rock-shaft without first revolving said shaft.

Figure 23:
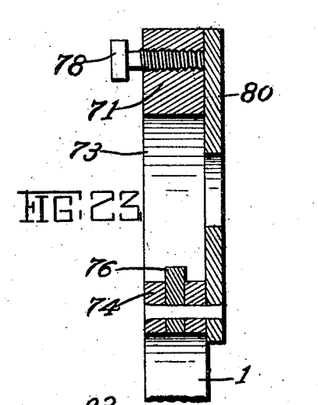
Fig. 23 is a section on the line 23—23 of Fig. 22.
Figure 24:
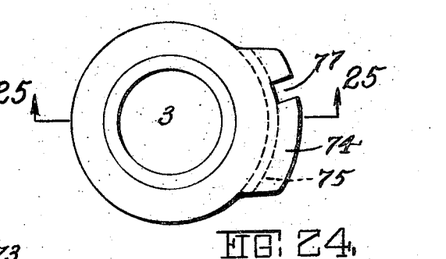
Fig. 24 is a plan view of the device which couples the trip arm to the rock shaft.
Figure 25:
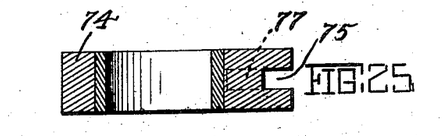
Fig. 25 is a section on the line 25—25 of Fig. 24.

The slot 73 is covered by a plate 80 removably held on the reduced end of the rock shaft (see Fig. 23) and which with the overhanging flange portion $1^1$ of the engine box A protects the head of the trip arm.

From the foregoing description and drawings it will thus be seen that the automatic diverting valve D normally connects the main reservoir M R with the train line system and the pipes $c$, $d$ and passage $D^1$ of the valve so that normally the engineer's valve E is continuously supplied with pressure. This supply however is subject to interruption through the branch pipe $d$ and vent valve 2, which valve opens to vent the train line system when the trip arm is effectively actuated.

The same movement of the rock shaft which allows the valve 2 to open simultaneously rotates the automatic valve D to shut off communication between the pipes $c$ and $d$, and hence discontinuing the feed of air from the main reservoir to the train line through the valve 2, and diverts the pressure from the pipe $c$ through by-pass $D^2$ to the pipe $s$ leading to the speed governed valve S. This valve S regulates the delivery of the direct pressure from the main reservoir to the engineer's permissive valve, which in its normal position allows the pressure to pass therethrough.

When the train speed has been reduced sufficiently, however, the engineer may reclose the system and proceed, without dismounting from his cab, by operating the permissive valve B to divert the exhaust pressure to the system reclosing apparatus, R, which automatically swings the rock shaft back to its normal position, causing the retainer 4 to close the valve 2, and automatically restoring communication between pipes $c$ and $d$, thus giving the control back to the engineer through his lap valve E.

It will further be observed that the parts are so disposed and supported that breakage or failure of any essential part of the system automatically secures a brake application, and that the trip arm is so mounted that it cannot be removed or drop off without revolving the rock shaft and causing an application of the brakes.

Various modifications in the formation and construction of my invention may obviously be resorted to, if within the limits of the appended claims.

What I therefore claim and desire to secure by Letters Patent is:

1. The combination with the train line pipe, main reservoir, and engineer's valve of an air brake system, of a pressure diverting valve, located between the engineer's valve and the reservoir and through which the pressure from the reservoir normally passes to the engineer's valve, an automatically tripped relief valve in the train line pipe effective upon actuation to relieve the train line pipe and to operate the pressure diverting valve whereby to shut the pressure in the main reservoir from the train line pipe, and a relief valve reclosing and pressure restoring mechanism into which the main reservoir pressure diverted from the train line pipe is emptied upon actuation of the relief-valve whereby to reclose said relief valve and to return the main reservoir pressure to the train line.

2. In automatic train stop apparatus, the combination with the air brake system and pressure supply source therefor, of a track-obstacle actuated relief mechanism for the air brake system, an engineer's resetting mechanism for said relief mechanism, and a pressure controlling mechanism normally connecting said air brake system and pressure relief source and automatically effective upon actuation of the brake system relief mechanism to shut-off the supply of pressure to the air brake system and divert the pressure for service to said resetting mechanism.

3. In automatic train stop apparatus, the combination with the air brake system and pressure supply source therefor, of a track-obstacle actuated relief mechanism for the air brake system, an engineer's resetting mechanism for said relief mechanism, an automatic speed governed mechanism dominating said engineer's resetting mechanism at speeds above a predetermined minimum speed and dominated by said engineer's resetting mechanism below said minimum speed, and a pressure controlling mechanism normally connecting said air brake system and pressure relief source and automatically effective upon actuation of the brake system relief mechanism to shut-off the supply of pressure to the air brake system, and divert the pressure for service to said resetting mechanism through said speed-governed mechanism.

4. The combination with the train line pipe, main reservoir and engineer's valve of an air brake system, of a pressure diverting valve located between the engineer's valve and the reservoir and through which the pressure from the reservoir normally passes to the engineer's valve, a resetting mechanism, and automatic relief mechanism under the control of said resetting mechanism within predetermined limits of train speed, and effective upon actuation by a track obstacle to relieve the train line pipe and to operate the pressure diverting valve whereby to shut-off the pressure in the reservoir from the train line pipe and to divert the pressure for service to said resetting mechanism if the train speed is within said predetermined limits.

5. In a device of the class described, in combination with the main reservoir and train line pipe of an air brake system, a pressure relief actuator therefor, a reset device for said pressure relief, a speed governed control valve dominating said reset device and through which the main reservoir pressure is passed upon operation of said relief actuator.

6. In combination with the main reservoir and train line pipe of an air brake system of a train, a valve controlling the relief of said train line pipe and adapted to be actuated by a track obstacle, a speed-governed control valve mechanism through which the main reservoir pressure is passed upon actuation of said valve, and an engineer's resetting mechanism dominated by said speed-governed mechanism at speeds above a predetermined minimum speed and dominating said speed-governed mechanism below said minimum speed.

7. In a train control system, in combination with the air reservoir and line therefor, an automatically tripped air relief valve cut in on said line, a speed governed reset control for the relief valve, an engineer's reset control device, a distributing valve operated simultaneously with said relief valve and cut in on the reservoir supply to the line ahead of the engineer's valve, and normally returning said reservoir pressure to said line but upon actuation shifting said pressure to said speed governed reset control mechanism whereby the engineer's reset control device is dominated by said speed governed mechanism at speeds above a predetermined minimum speed and dominating said mechanism below said speed.

8. In combination with the air brake system and pressure supply source of a train, an automatically-tripped valve for relieving said system, a speed governed control valve, an engineer's permissive reset valve, a resetting device, a distributing valve effective upon actuation of said relief valve to divert the pressure from the pressure supply source to said speed-governed control valve, and connections from said speed-governed control valve leading through said engineer's reset valve to said reset device for utilizing said diverted pressure to reclose the relief valve.

9. The combination with the train line pipe, main reservoir and engineer's valve of an air brake system, of a pressure diverting valve located between the engineer's valve and the reservoir and through which the pressure from the reservoir normally passes to the engineer's valve, a resetting mechanism, and automatic relief mechanism effective upon actuation by a track obstacle to relieve the train line pipe and to operate the pressure diverting valve whereby to shut-off the pressure in the reservoir from the train line pipe and to divert the pressure for service to said resetting mechanism.

10. In automatic train stop mechanism, the combination with the air brake system of a train and the pressure supply source for said system, of a valve controlling the relief of said system, a retainer normally holding said valve closed, a rock shaft effective upon operation to release said retainer to permit opening of said valve, a pressure diverting valve mounted upon said rock shaft and effective in such operation of the rock shaft to shut-off the pressure supply from the pressure supply source to the air brake system, and a track-obstacle actuated trip operatively connected with said rock shaft.

11. In combination with the main reservoir and train line pipe of an air brake system, an automatically tripped relief valve in said train line, a resetting mechanism for said relief valve, an engineer's permissive valve controlling said resetting mechanism, a speed governed valve associated with said permissive valve, and a distributing valve normally connecting said reservoir and train line relief valve but effective upon actuation of said relief valve to shut-off the pressure supply to the air brake system and to divert the pressure for service through said speed governed valve to said permissive valve.

In testimony whereof I affix my signature in presence of two witnesses.

RICHARD MARCY.

Witnesses:
  VICTORIA LOWDEN,
  GEO. B. RAWLINGS.